United States Patent [19]
Marvel et al.

[11] 3,907,748  
[45] Sept. 23, 1975

[54] PARACYCLOPHANE POLYMERS AND THE PRODUCTION THEREOF

[75] Inventors: Carl S. Marvel; Daniel Ting-Man Wong; Ira John Westerman; Celeste Samyn, all of Tucson, Ariz.; Parameswar Sivaramakrishnan, New Martinsville, W. Va.

[73] Assignee: University Patents, Inc., Stamford, Conn.

[22] Filed: June 17, 1974

[21] Appl. No.: 479,983

[52] U.S. Cl. .............. 260/49; 161/192; 260/30.8 R; 260/32.6 R
[51] Int. Cl.² ......................................... C08G 75/23
[58] Field of Search ............................ 260/49, 47 C

[56] References Cited
UNITED STATES PATENTS

| 3,770,699 | 11/1973 | White | 260/49 |
| 3,772,248 | 11/1973 | Brown et al. | 260/49 |

*Primary Examiner*—Lester L. Lee
*Attorney, Agent, or Firm*—Mason, Kolehmainen, Rathburn & Wyss

[57] ABSTRACT

A linear paracyclophane polymer composed of bis(phenoxybenzoyl)paracyclophane molecules and molecules selected from the group consisting of bis(phenoxybenzenesulfonyl)-benzene and bis(phenoxybenzenesulfonyl)diphenyl ether, linked together with bivalent radicals selected from the group consisting of isophthaloyl and terephthaloyl radicals.

11 Claims, 8 Drawing Figures

US Patent  Sept. 23, 1975  3,907,748
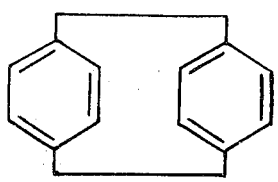
I
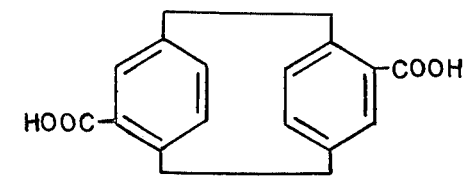
II
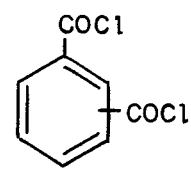
III
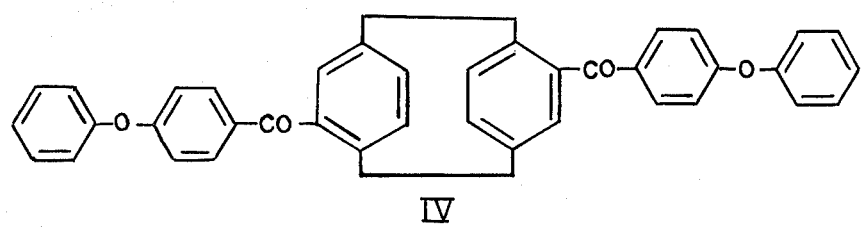
IV
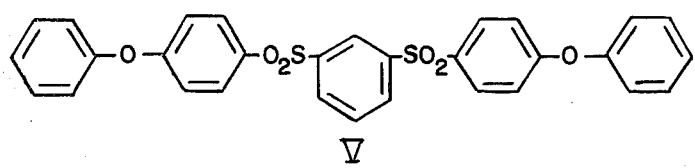
V
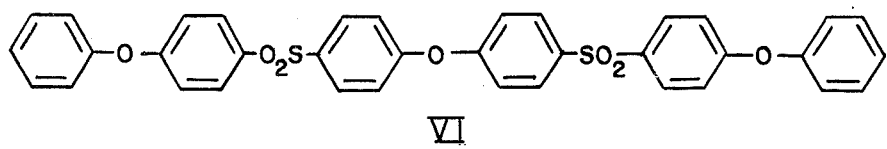
VI
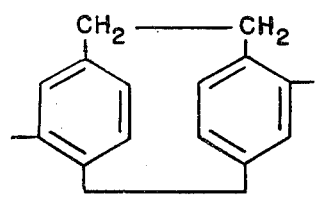
VII
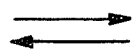
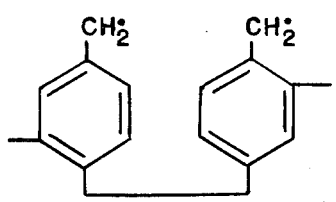
VIII

PARACYCLOPHANE POLYMERS AND THE PRODUCTION THEREOF

This invention relates to organic polymers containing paracyclophane nuclei and to crosslinked forms of such polymers. The invention also relates to methods of producing such polymers.

BACKGROUND OF THE INVENTION

Filled resins, e.g., glass fiber and fabric reinforced resins, are well known as suitable materials for forming structural units in the aircraft and other industries. A wide variety of resins have been proposed in the past for formulating such structures and as laminating resins for joining various materials. For example, polyester, epoxy and polycarbonate resins have been utilized as matrix resins for glass fiber-resin laminates. One of the difficulties experienced in the use of these resins, however, is that they are difficult to mold and mechanically work. Thus, it is often necessary to apply the resin in liquid form to the glass fibers on substrate to be laminated and then solidify the composite in order to obtain a suitable product. The resins previously used have to be melted or dissolved in a suitable solvent in order to achieve the desired liquid form. Many of these resins, however, decompose or suffer some deleterious chemical change when heated to temperatures sufficiently high to achieve melting. The result is a laminate or reinforced resin with reduced strength and physical properties.

Moreover, many of the previously used resins are insoluble in conventional volatile solvents. In addition, when forming laminates with solvent solutions of resins, it is necessary to employ special means for driving off and collecting those solvents which are capable of dissolving the resins but are relatively non-volatile.

In addition, the prior art matrix and laminating resins do not possess a sufficiently high degree of thermal stability which is requisite in many industrial applications.

It has been heretofore proposed to provide low melting laminating polymers. These polymers may be melted at low temperatures, contacted with the filler material or substrate to be laminated and cured or cross-linked to the resinous state. A serious disadvantage associated with these low-melting polymers, however, is that cross-linking involves a chemical reaction which liberates a volatile by-product such as carbon dioxide or water. The liberation of these reaction products operates to form voids in the resulting product. Obviously, the prior art low-melting laminating polymers may not be used in applications requiring close tolerance or uniform compositions throughout.

It is an object of the invention to provide low-melting polymers which may easiily be admixed with fillers or contacted with substrates to be laminated and cross-linked to form a firmly bonded article having a uniform composition throughout.

It is a further object of the invention to provide novel reinforced and laminated resin compositions having high degrees of strength and thermal stability.

It is another object to provide low-melting polymers which may be crosslinked without the production of volatile materials.

SUMMARY OF THE INVENTION

The above and other objects are achieved by providing low-melting polymers containing [2.2]paracyclophane nuclei. These polymers are produced from 3,9-bis(p-phenoxybenzoyl)[2.2]paracyclophane and a polyaryl ether sulfone, such as 1,3-bis(p-phenoxybenzenesulfonyl)benzene or 4,4'-bis(p-phenoxybenzenesulfonyl)diphenyl ether, by Friedel-Crafts polymerization with isophthaloyl or terephthaloyl chloride. The dibasic aryl moieties link the paracyclophane and polyaryl ether sulfone molecules together in substantially linear polymers with molecular weights from about 30,000 to over 100,000. The polymers so produced are relatively low-melting and are suitable for laminations. They are readily cured or cross-linked by heating at relatively low temperature to produce strong infusible resins. The crosslinking occurs by themal homolysis of the dimethylene bridge of the [2.2]paracyclophane nucleus to produce a substituted p,p'-dimethylene bibenzyl diradical. This diradical can combine intermolecularly with other polymer units, thus producing ethylenic polymer crosslinks. The crosslinking takes place without the release of void-forming volatile materials.

When the paracyclophane polymers of this invention are crosslinked while in contact with a filler or substrate to be laminated, the result is a product having a high degree of strength and thermal stability wherein the crosslinked polymer is firmly adhered to the filler or substrate.

BRIEF DESCRIPTION OF THE DRAWING

Reference is made to the attached drawings which illustrate by structural formula the starting materials and some of the polymers of this invention. In the drawings I represents [2.2]paracyclophane whic constitutes the crosslinking nucleus in the polymers and II represents [2.2]paracyclophane-3,9-dicarboxylic acid which is a starting material for the polymers. The intermediates for the linear polymers are isophthaloyl or terephthaloyl chloride III, 3,9-bis(p-phenoxybenzoyl)[2.2-]paracyclophane IV, and 1,3-bis(p-phenoxybenzenesulfonyl)benzene V or 4,4'-bis(p-phenoxybenzenesulfonyl)diphenyl ether VI. In forming the linear polymers, IV and V and/or VI are joined by Friedel-Crafts polymerization with one or both of the isomeric acid chlorides III. The polymers are made up of combinations of IV and V and/or VI with phthaloyl radicals III interconnecting them. The sequence of the IV, V and/or VI moieties is random. For example, the polymer can be illustrated as follows:

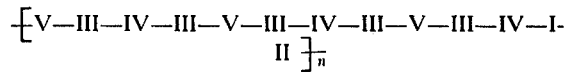

which is a regular sequence, or as follows:

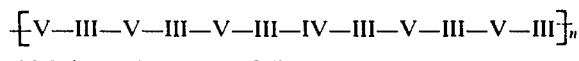

which is random, or as follows:

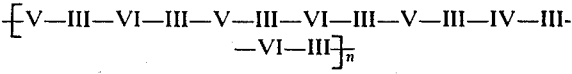

In the above formulas, $n$ represents a number from about 15 to 100.

On heating of the polymers illustrated above, the paracyclophane nucleus I of the polymer, which is illustrated as VII in the drawing, is thermally homolyzed to the biradical VIII. The latter can form crosslinks with similar radicals in other polymer chains.

DETAILED DESCRIPTION OF THE INVENTION

Linear Polymers

In one preferred form, this invention comprises linear polymers produced from V and IV linked together in random sequence by iso- and/or terephthaloyl radicals. In another form, the linear polymers can be produced from VI and IV, and in a third form, they are produced from IV and a mixture V and VI. The ratio of the moles of V (or VI) to IV can vary from 1:1 to 20:1. The quantity of iso- and/or terephthaloyl radicals is approximately equivalent to the total moles of V and VI, usually in the range of 0.8 to 1.2 moles per mole of V and VI. The polymerization is carried out in the presence of anhydrous aluminum chloride in an inert solvent.

Aromatic ethers, ketones and sulfones are known to be thermally quite stable. Consequently, polymers containing these functional groups and incorporating paracyclophane units are materials of great potential as high-temperature-resistant laminating resins.

The polymers described above have average molecular weights from about 30,000 to 120,000. Such polymers are relatively low melting. At temperatures in the range of 180° to 220°C. they melt, flow easily and adhere to glass fibers. They are all soluble in DMF. They are thus useful as laminating resins. The linear polymers give excellent adhesion to glass fiber and produce homogeneous laminates with 33 wt % of polymer to glass fiber at 1 hour at 260°C. and 16,000 psi.

Polymers incorporating between 5% and 29% by weight of 3,9-bis-(p-phenoxybenzoyl)[2.2]paracyclophane have been prepared by Friedel-Crafts polymerization with 1,3-bis(p-phenoxybenzenesulfonyl)benzene and isophthaloyl chloride. The polymers investigated and the weight contributions of each component are listed in Table I. In addition a polymer from a mixed acid chloride (2:1 ratio of isophthaloyl and terephthaloyl chloride) and one from terephthaloyl chloride have been prepared, each containing 15 wt % of the [2.2]paracyclophane unit.

TABLE 1

WEIGHT PERCENTAGES FOR POLYMERS OF 1,3-BIS(p-PHENOXYBENZENESULFONYL)BENZENE AND 3,9-BIS(p-PHENOXYBENZOYL) [2.2] PARACYCLOPHANE WITH ISOPHTHALOYL CHLORIDE

| Polymer | Wt % of Paracyclophane | Wt % of Disulfone | Wt % of Iosphthaloyl Chloride |
|---|---|---|---|
| DTW-5 | 5.5 | 75.0 | 19.5 |
| DTW-1 | 8.8 | 71.7 | 19.5 |
| PS-CP-3 | 8.8 | 71.7 | 19.5 |
| PS-CP-1 | 15.8 | 64.8 | 19.4 |
| DTW-3 | 16.6 | 64.1 | 19.3 |
| PS-CP-6 | 20.2 | 60.5 | 19.3 |
| DTW-4 | 22.0 | 58.8 | 19.2 |
| PS-CP-7 | 26.1 | 54.8 | 19.1 |
| DTW-2 | 28.7 | 52.2 | 19.1 |

A comparison of the melting points of these polymers has revealed several general trends. First, the replacement of isophthaloyl by terephthaloyl units in the polymer raises the melting point. In the case of PS-CP-1 (isophthaloyl units) and PS-CP-5 (terephthaloyl units) which contain identical amounts of the [2.2]paracyclophane component, the melting point was increased by 30°-35°C. Secondly, increasing amounts of the [2.2]paracyclophane unit raise the melting points of the resultant polymers. For example, polymers containing 5-15 wt % of the [2.2]paracyclophane monomer melt in the range of 180°-210°C; whereas, the polymers possessing larger amounts (22-29 wt %) of this component apparently crosslink before the melting point is reached.

The solubilities parallel the melting points: polymers containing a larger number of [2.2]paracyclophane units exhibit lower solubilities than those possessing smaller amounts of the [2.2]paracyclophane monomer. All of these polymers are insoluble in dioxane. Solutions containing up to 30% of the 8 wt % paracyclophane polymer (inherent viscosity 0.391 in $H_2SO_4$ at 30°C) have been made with the following solvents: acetophenone, 1,1,2,2-tetrachloroethane and 1,1,2-trichloroethane. However, when the paracyclophane content has been increased to 26 wt %, concentrated solutions have not proven possible with either of these solvents or with sulfolane or with dimethylacetamide. The polymers are, however, slightly soluble in dimethylacetamide and sulfolane.

The low solubility of these polymers in $H_2SO_4$ has necessitated heating the sample to get solution. Under such conditions degradation and sulfonation may occur. This may account for the moderately low inherent viscosities observed in $H_2SO_4$ and for the larger values obtained with hexamethylphosphoric triamide (HMPA) as the solvent.

Crosslinked Polymers

The linear paracyclophane polymers at 325°C. for 24 hours, or at 350°C. for 6-7 hours, are homolyzed and crosslinked. The polymer from PS-CP-1 containing 15 wt % of IV at 350°C for 24 hours exhibited almost complete crosslinking. At 350°C for four hours this polymer gave crosslinked product in 85% yield. The crosslinked PS-CP-1-C polymer sintered very slightly whereas the uncured sample fused and melted easily. Both the polymer and crosslinked polymer exhibited a TGA break at approximately 475°C in nitrogen.

Polymer PS-CP-3 having only 9 wt % of 3,9-bis(p-phenoxybenzoyl)[2.2]paracyclophane showed no substantial crosslinking on heating at 350°C for 24 hours. Cured polymers from PS-CP-4 and PS-CP-5 showed crosslinking to some degree but not to the extend of PS-CP-1.

To investigate the effect of a higher degree of crosslinking in the thermal and softening properties, terpolymers of the PS-CP-1 type (isophthaloyl units) having 20, 26 and 29 wt % of 3,9-bis(p-phenoxybenzoyl)[2.2-]paracyclophane were prepared. Polymer DTW-1 (9 wt % of the [2.2]paracyclophane component) has been cured at different temperatures (250°-350°C) and for various periods (24-48 hours) to determine maximum crosslinking procedures. Identical experiments have been performed for sample DTW-2 (29 wt % of the [2.2]paracyclophane).

Isothermal Aging Experiments

Isothermal aging experiments were run in circulating air. The isothermal weight losses of these polymers at different temperatures are compiled in Table II. All of these polymers as well as the crosslinked materials exhibited good thermal stability at 250°C with weight losses around 5% in 200 hours and fair thermal stability at 275°C with weight losses around 6-7% but showed considerable weight losses around 15-20% at 300°C. Polymer PS-CP-5 having terephthaloyl units exhibited better isothermal stability than polymers containing the isophthaloyl unit. Considerable weight losses exhibited at 300°C by these polymers may be due to the oxidation of benzylic C-H bonds.

TABLE II

ISOTHERMAL WEIGHT LOSSES FOR POLYMERS CONTAINING [2.2]PARACYCLOPHANE UNITS

| Polymer | Percent loss of weight | | |
|---|---|---|---|
| | 7 days at 250°C | 7 days at 275°C | 7 days at 300°C |
| PS-CP-3 | 4.1 | 6.5 | 16.9 |
| PS-CP-3-C | 4.2 | 6.8 | 18.5 |
| PS-CP-1 | 8.0 | 13.3 | 15.0 |
| PS-CP-1-C | 11.1 | 15.5 | 21.0 |
| PS-CP-6 | 3.4 | 4.8 | 17.4 |
| PS-CP-6-C | 10.4 | 10.9 | 14.6 |
| PS-CP-7 | 10.4 | 11.8 | 13.8 |
| PS-CP-7-C | 14.2 | 15.2 | 21.5 |
| PS-CP-2 | 5.0 | 10.3 | 22.0 |
| PS-CP-2-C | 17.7 | 19.2 | 24.0 |
| PS-CP-4 | 5.8 | 7.0 | 11.3 |
| PS-CP-4-C | 5.3 | 7.9 | 19.6 |
| PS-CP-5 | 3.3 | 5.1 | 12.7 |
| PS-CP-5-C | 1.2 | 2.5 | 10.6 |

EXAMPLE 1

A. Dibromination of [2.2]paracyclophane

A solution of 46.2 g (0.288 mole) of bromine in 400 ml of carbon tetrachloride was prepared and 30 ml of this solution was stirred with 0.4 g of iron filings and 300 ml of dichloromethane for 1 hour. Dichloromethane (500 ml) was added, the solution was brought to reflux, and 30 g (0.144 mole) of [2.2]paracyclophane was added. The remainder of the bromine solution was added over a period of 3 hours. After completion of the bromine addition, the mixture was refluxed for 0.5 hour. The reaction mixture was washed several times with 10% sodium bisulfite solution, then with saturated sodium chloride solution and dried. After removal of solvent the crude product was dissolved in 500 ml of hot chloroform, 300 ml of ether was added and it was allowed to crystallize. Yield 16.5 g (31%); mp 245°-249°C.

B. Dicarboxyl[2.2]paracyclopane

A mixture of 350 ml of ether and 200 ml of 2 N n-butyllithium in hexane was stirred under nitrogen for 15 minutes and 12.3 g (32.9 m mole) of pseudo-p-dibromo[2.2]paracyclophane was added. After the solution had stirred at room temperature for 20 hours, it was dumped into dry ice (solid carbon dioxide). Water (500 ml) was added and the aqueous layer separated was collected. Ether layer was washed with additional 50 ml of water. The combined aqueous layer was neutralized with hydrochloric acid. The precipitated acid was filtered and washed with large volume of water to remove valeric acid (formed by reaction of excess n-butyllithium with $CO_2$). The crude acid 8.5 g (88% yield) was dried at 100°C. The infrared spectrum showed a carbonyl absorption at 1675 $cm^{-1}$ (in Nujol) or at 1650 $cm^{-1}$ (in KBr). Crystallization from dimethylformamide-water (4:1 ratio) afforded a white powder, mp ≈ 500°C.

Anal. Calc. for $C_{18}H_{16}O_4$: C, 72.96%; H, 5.44%. Found: C, 74.09%; H, 5.65%.

C. [2.2]Paracyclophane-3,9-dicarboxylic acid chloride

Dicarboxyl[2.2]paracyclophane (6.0 g) was refluxed with 120 ml of thionyl chloride for 3 hours. Removal of excess thionyl chloride under aspirator pressure gave 6.1 g of [2.2]paracyclophane-3,9-dicarboxylic acid chloride. This was washed with petroleum ether to give yellow colored powder 5.8 g (78%), mp 213°-218°C. The infrared spectrum showed a carbonyl absorption at 1665 $cm^{-1}$ (Nujol).

Anal. Calc. for $C_{18}H_{14}O_2Cl_2$: C, 64.88%; H, 4.21%; Cl, 21.33%. Found: C, 65.01%; H, 4.57%; Cl, 21.67%.

D. 3,9-Bis(p-phenoxybenzyl)[2.2]paracyclophane

To a solution of 12.0 g (32.8 mM) of [2.2]paracyclophanedicarboxylic acid chloride in 600 ml of diphenyl ether was added 60 g of $AlCl_3$. After the suspension had been stirred at room temperature for 24 hours, the mixture was washed with water and then dried over sodium sulfate. The distillaton of 400 ml of diphenyl ether under reduced pressure and the addition of 500 ml of petroleum ether to the residual solution precipitated 15.5 g (79%) of a white solid, mp 244°-246°C. The product showed a carbonyl absorption at 1645 $cm^{-1}$ (KBr).

Anal. Calc. for $C_{42}H_{32}O_4$: C, 84.00%; H, 5.33%. Found: C, 83.76%; H, 5.37%.

EXAMPLE 2

A. 1,3-Bis(p-phenoxybenzenesulfonyl)benzene

To a solution of 137.0 g (0.498 mole) of m-benzenedisulfonyl chloride in 170 g of diphenyl ether was added 1.0 g of ferric chloride. The reaction was stirred at 170°C for 24 hr. After the reaction had cooled to room temperature, ethyl ether was added and the mixture was washed with water. The ether layer was separated, filtered, and dried over $Na_2SO_4$. Evaporation of the ether and distillation of diphenyl ether under reduced pressure afforded a crude solid. The crude product then was distilled under high vacuum (0.1 mm) with an open flame. The distillate solidified upon cooling and was dissolved in 40 ml of chloroform and 800 ml of ethyl ether. A small amount of insoluble black residue was filtered from the solution. The addition of 800 ml of petroleum ether precipitated 160 g (63%) of a white powder, mp 70°-75°C.

B. 4,4'-Bis(p-phenoxybenzenesulfonyl)diphenyl ether

To a solution of phenoxybenzene-4,4'-disulfonyl chloride (60 g, 0.163 mole) in 400 ml of dry diphenyl ether (429.2 g, 2.52 mole) was added 3.0 g of ferric chloride. The mixture was stirred under nitrogen and heated to 160°-165°C for 48 hours. The cooled suspension was filtered free of ferric chloride and petroleum ether (500 ml) was added to precipitate a brown solid. The resultant precipitate was filtered and then extracted in a Soxhlet for 10 hours with 800 ml of methanol. The material not extracted by methanol was dissolved in chloroform and then passed through a short (25 cm) alumina column. Concentration of the chloroform and the addition of petroleum ether precipitated 53.4 g (52%) of a white solid, mp 196°-200°C.

EXAMPLE 3

Polymers from 1,3-bis(p-phenoxybenzenesulfonyl)benzene containing varying amounts of the [2.2]paracyclophane unit in the backbone

A. Preparation of 6 wt % of 3,9-bis(p-phenoxybenzoyl)

[2.2]paracyclophane (using isophthaloyl chloride)

To a solution of 1,3-bis(p-phenoxybenzenesulfonyl)-benzene (3.394 g, 6.25 mM), 3,9-bis(p-phenoxybenzoyl)[2.2]paracyclophane (0.250 g, 0.42 mM), and isophthaloyl chloride (1.356 g, 6.68 mM) in 125 ml of dry dichloroethane was added 4.5 g of $AlCl_3$. The suspension was stirred under nitrogen atmosphere at room temperature for 24 hours. The precipitate was filtered off and washed four times with methanol in a blender. Yield 3.0 g (67%); mp 185°–210°C. The sample was labelled as DTW-5.

B. Preparation of 9 wt % of 3,9-bis(p-phenoxybenzyl)[2.2]paracyclophane (using isophthaloyl chloride)

1,3-Bis(p-phenoxybenzenesulfonyl)benzene (2.439 g, 4.5 mM), 3,9-bis(p-phenoxybenzoyl)[2.2]paracyclophane (0.30 g, 0.5 mM) and isophthaloyl chloride (1.015 g, 5.0 mM) were dissolved in 75 ml of dry dichloroethane. $AlCl_3$ (3.33 g) was added and the mixture stirred under nitrogen atmosphere at room temperature during 24 hours. The precipitate was filtered off and washed four times with methanol in a blender. Yield 3.08 g, mp 190°–210°C. Inherent viscosity 0.659 in $H_2SO_4$ at 30°C. Sample identified as PS-CP-3.

Anal. Calc.: C, 69.50%; H, 3.81%; S, 8.44%. Found: C, 67.79%; H, 4.14%; S, 7.52%; Res., 1.74%.

Three hundred mg of PS-CP-3 was heated at 360°C in nitrogen atmosphere for 24 hours. The dark black colored product was refluxed in 100 ml of dimethyl acetamide, filtered, washed with water and dried. Quantitative yield of crosslinked polymer (insoluble in dimethylacetamide) was obtained. This crosslinked polymer was labelled as PS-CP-3-C.

Anal. Calc.: C, 69.21%; H, 3.97%; S, 8.47%. Found: C, 67.79%; H, 4.14%; S, 7.52%; Res., 1.74%.

C. Large scale preparation of 9 wt % 3,9-bis(p-phenoxybenzoyl)[2.2]paracyclophane (using isophthaloyl chloride)

To a solution of 1,3-bis(p-phenoxybenzenesulfonyl)-benzene (45.47 g, 83.80 mM), 3,9-bis(p-phenoxybenzyl)[2.2]paracyclophane (5.60 g, 9.32 mM), and isophthaloyl chloride (18.926 g, 93.22 mM) in 1,400 ml of dry dichloroethane was added 63 g of $AlCl_3$. The suspension was stirred under nitrogen for 24 hours at room temperature. The mixture was filtered and the precipitate was washed four times with methanol in a blender. Yield 52 g (83%); mp 190°–215°C. Inherent viscosity 0.42 in $H_2SO_4$ at 30°C. (heating required to effect solution). The sample was labelled as DTW-1.

Anal. Calc. for DTW-1: C, 69.21%; H, 3.97%; S, 8.47%. Found: C, 69.03%; H, 3.64%; S, 8.53%.

A 0.488 g sample of DTW-1 was cured at 250°C for 48 hr and then was boiled with 20 ml of dimethylacetamide for one hour. After the solvent was filtered the polymer was washed with water and dried under vacuum at 160°C. Yield 0.415 g (85%). Other samples were cured at 350°C for 24 and 48 hours and at 300°C for 36 and 48 hours.

A laminate was formed from DTW-1 (300 mg) sandwiched between three pieces of glass fiber fabric (600 mg). Eight drops of dimethylacetamide were added to the fabric on each side. The sample was folded within aluminum foil and pressed under 15,000 psi at 250°C for 0.5 hr.

D. Preparation of 16 wt % of 3,9-bis(p-phenoxybenzoyl)-[2.2]paracyclophane (using isophthaloyl chloride)

1,3-Bis-(p-phenoxybenzenesulfonyl)benzene (2.22 g, 4.1 mM), 3,9-bis(p-phenoxybenzoyl)[2.2]paracyclophane (0.54 g, 0.9 mM) and isophthaloyl chloride (1.015 g, 5.0 mM) were dissolved in 75 ml of dry dichloroethane. $AlCl_3$ (3.33 g) was added and the mixture stirred under nitrogen atmosphere at room temperature during 24 hours. The precipitate was filtered off and washed four times with methanol in a blender. Yield 3.23 g (88%), mp 185°–210°C. Inherent viscosity 0.38 in $H_2SO_4$ at 30°C.
Sample identified as PS-CP-1.

Anal. Calc.: C, 70.15%; H, 3.90%; S, 7.66%. Found: C, 69.98%; H, 3.8,%; S, 7.55%.

A 300 mg sample of PS-CP-1 was heated at 360°C in nitrogen atmosphere for 24 hours. The resultant dark colored product was boiled with 100 ml of dimethylacetamide and filtered, washed with water and dried. Almost quantitative yield of crosslinked polymer (insoluble in dimethylacetamide) was obtained. This crosslinked polymer was labelled as PS-CP-1-C.

Anal. Calc.: C, 70.15%; H, 3.90%; S, 7.66%. Found: C, 70.90%; H, 4.04%; S, 7.17%; Res., 0.84%.
Crosslinking reaction was also effected in 85% yield by heating PS-CP-1 at 360°C for 4 hours.

E. Preparation of 17 wt % of 3,9-bis(p-phenoxybenzoyl)-[2.2]paracyclophane (using isophthaloyl chloride)

To a solution of 1,3-bis(p-phenoxybenzenesulfonyl)-benzene (2.907 g, 5.36 mM), 3,9-bis(p-phenoxybenzoyl)[2.2]paracyclophane (0.750 g, 1.25 mM), and isophthaloyl chloride (1.343 g, 6.61 mM) in 125 ml of dry dichloroethane was added 4.5 g of $AlCl_3$. The suspension was stirred under nitrogen for 24 hours at room temperature. The mixture was filtered and the precipitate was washed four times with methanol in a blender. Yield 3.0 g (66%); mp 180°–210°C. The sample was labelled as DTW-3.

F. Preparation of 20 wt % of 3,9-bis(p-phenoxybenzoyl)-[2.2]paracyclophane (using isophthaloyl chloride)

To a solution of 1,3-bis(p-phenoxybenzenesulfonyl)-benzene (2.08 g, 3.83 mM), 3,9-bis(p-phenoxybenzoyl)[2.2]paracyclophane (0.69 g, 1.15 mM), and isophthaloyl chloride (1.015 g, 5.0 mM) in 75 ml of dry dichloroethane was added 3.3 g of $AlCl_3$. The suspension was stirred under nitrogen for 24 hours at room temperature. The precipitate was filtered from the mixture and washed four times with methanol in a blender. Yield 3.2 g (94%); mp 210°–225°C. Inherent viscosity 0.34 in $H_2SO_4$ at 30°C. The sample was submitted as PS-CP-6.

Anal. Calc.: C, 71.29%; H, 3.98%; S, 7.18%. Found: C, 69.09%; H, 4.12%; S, 6.73%, Res., 2.67%.

A sample (300 mg) of PS-CP-6 was heated at 350°C in a nitrogen atmosphere for 24 hours. The resultant black product was boiled with 100 ml of dimethylacetamide and then filtered, washed with water and dried. An almost quantitative yield of crosslinked polymer (insoluble in dimethylacetamide) was obtained. This crosslinked product was PS-CP-6-C.

Anal. Calc.: C, 71.29%; H, 3.98%; S, 7.18%. Found: C, 70.60%; H, 4.30%; S, 5.92%; Res., 2.29%.

G. Preparation of 22 wt % of 3,9-bis(p-phenoxybenzoyl)-[2.2]paracyclophane (using isophthaloyl chloride)

To a solution of 1,3-bis(p-phenoxybenzenesulfonyl)-benzene (2.663 g, 4.91 mM), 3,9-bis(p-phenoxybenzoyl)[2.2]paracyclophane (1.00 g, 1.66 mM), and isophthaloyl chloride (1.337 g, 6.59 mM) in 125 ml of dry dichloroethane was added 4.5 g of $AlCl_3$. The suspension was stirred under nitrogen for 24 hours at room temperature. The mixture was filtered and the precipitate was washed four times with methanol in a blender. Yield 3.3 g (73%); mp>360°C (crosslinked prior to melting). The sample was labelled as DTW-5.

H. Preparation of 26 wt % of 3,9-bis(p-phenoxybenzyol)-[2.2]paracyclophane (using isophthaloyl chloride)

To a solution of 1,3-bis(p-phenoxybenzenesulfonyl)-benzene (1.895 g, 3.5 mM), 3,9-bis(p-phenoxybenzoyl)[2.2]paracyclophane (0.90 g, 1.5 mM), and isophthaloyl chloride (1.015 g, 5.0 mM) in 75 ml of dry dichloroethane was added 3.3 g of $AlCl_3$. The suspension was stirred under nitrogen for 24 hours at room temperature. The precipitate was filtered from the mixture and washed four times with methanol in a blender. Yield 3.1 g (90%); mp 210°–225°C; inherent viscosity 0.411 in $H_2SO_4$ at 30°C. The sample was PS-CP-7.

Anal. Calc.: C, 71.07%; H, 4.24%; S, 6.78%. Found: C, 69.28%; H, 3.83%; S, 5.66%; Res., 4.48%.

A 300 mg sample of PS-CP-7 was heated under nitrogen at 350°C for 24 hours. The resultant black solid was boiled with 100 ml of dimethylacetamide and then filtered, washed with water and dried. An almost quantitative yield of crosslinked polymer (insoluble in dimethylacetamide) was obtained. The crosslinked product was labelled as PS-CP-7C.

Anal. Calc.: C, 71.07%; H, 4.24%; S, 6.78%. Found: C, 69.67%; H, 4.26%; S, 5.42%; Res., 5.10%.

I. Preparation of 29 wt % of 3,9-bis(p-phenoxybenzoyl)-[2.2]paracyclophane (using isophthaloyl chloride)

To a solution of 1,3-bis(p-phenoxybenzenesulfonyl)-benzene (33.21 g, 61.2 mM), 3,9-bis(p-phenoxybenzoyl)[2.2]paracyclophane (18.20 g, 30.3 mM), and isophthaloyl chloride (18.59 g, 91.6 mM) in 1,400 ml of dry dichloroethane was added 63 g of $AlCl_3$. The suspension was stirred under nitrogen for 24 hours at room temperature and for 2 hours at 40°C. The mixture was filtered and the precipitate was washed 5 times with methanol in a blender. Yield 55 g (87%); mp 360°C (crosslinked prior to melting). Inherent viscosity 0.79 in HMPA at 30°C (heating required to effect solution). The sample was labelled as DTW-2.

Anal. Calc.: C, 72.73%; H, 4.17%; S, 6.17%. Found: C, 71.34%; H, 4.13%; S, 5.65%.

J. Preparation of 15 wt % of 3,9-bis(p-phenoxybenzoyl)-[2.2]paracyclophane (using isophthaloyl chloride and terephthaloyl chloride in the ratio of 2:1)

1,3-bis(p-phenoxybenzenesulfonyl)benzene (2.22 g, 4.1 mM), 3,9-bis(p-phenoxybenzoyl)[2.2]paracyclophane (0.54 g, 0.9 mM), isophthaloyl chloride (0.645 g, 3.18 mM) and terephthaloyl chloride (0.372 g, 1.83 mM) were dissolved in 75 ml of dry dichloroethane. $AlCl_3$ (3.33 g) was added and the mixture stirred under nitrogen atmosphere at room temperature during 24 hours. The precipitate was filtered off and washed four times with methanol in a blender. Yield 3.15 g (92%); mp 195°–210°C. Inherent viscosity 0.36 in $H_2SO_4$ at 30°C. Sample submitted as PS-CP-4.

Anal. Calc.: C, 70.15%; H, 3.90%; S, 7.66%. Found: C, 69.66%; H, 4.22%; S, 6.38%; Res., 2.10%.

A 300 mg sample of PS-CP-4 was heated at 360°C in nitrogen atmosphere for 24 hours. The dark product was boiled with 100 ml of dimethylacetamide, filtered, washed with water and dried. Almost quantitative yield of crosslinked polymer (insoluble in dimethylacetamide) was obtained. This crosslinked polymer was labelled as PS-CP-4-C.

Anal. Calc.: C, 70.15%; H, 3.90%; S, 7.66%. Found: C, 68.73%; H, 4.18%; S, 6.16%; Res., 4.25%.

K. Preparation of 15 wt % of 3,9-bis(p-phenoxybenzoyl)-[2.2]paracyclophane (using terephthaloyl chloride)

1,3-Bis(p-phenoxybenzenesulfonyl)benzene (2.22 g, 4.1 mM), 3,9-bis(p-phenoxybenzoyl)[2.2]paracyclophane (0.54 g, 0.9 mM) and terephthaloyl chloride (1.015 g, 5.0 mM) were dissolved in 75 ml of dry dichloroethane. $AlCl_3$ (3.33 g) was added and the mixture stirred under nitrogen atmosphere at room temperature during 24 hours. The precipitate was filtered off and washed three times with methanol in a blender. Yield 3.20 g (94%); mp 225°–240°C. Inherent viscosity 0.38 in $H_2SO_4$ at 30°C. Sample submitted as PS-CP-5.

Anal. Calc.: C, 70.15%; H, 3.90%; S, 7.66%. Found: C, 69.70%; H, 4.01%; S, 6.90%; Res., 2.32%.

A 300 mg sample of PS-CP-5 was heated at 360°C in nitrogen atmosphere for 24 hours. The dark black colored product was boiled with 100 ml dimethylacetamide, filtered, washed with water and dried. A quantitative yield of crosslinked polymer (insoluble in dimethylacetamide) was obtained. This crosslinked polymer was labelled as PS-CP-5-C.

Anal. Calc.: C, 70.15%; H, 3.90%; S, 7.66%. Found: C, 68.73%; H, 4.18%; S, 6.16%; Res., 4.25%.

EXAMPLE 3

Polymers from 4,4'-bis(p-phenoxybenzenesulfonyl)diphenyl ether containing varying amounts of the [2.2]paracyclophane unit

A. Preparation of polymer with 5 wt % of 3,9-bis(p-phenoxybenzoyl)[2.2]paracyclophane (using isophthaloyl chloride)

To a solution of 4,4'-bis(p-phenoxybenzenesulfonyl)-diphenyl ether (7.81 g, 12.3 mM), 3,9-bis(p-phenoxybenzoyl)-[2.2]paracyclophane (0.50 g, 0.8 mM), and isophthaloyl chloride (2.66 g, 13.1 mM) in 400 ml of dry dichloroethane was added 13.3 g of $AlCl_3$. The suspension was stirred under nitrogen for 24 hours at room temperature. The mixture was filtered and the precipitate was washed 3 times with methanol and twice with chloroform in a blender. Yield 8.2 g (82%); mp>360°C (crosslinked prior to melting). The sample was labelled as JW-P2.

Anal. Calc.: C, 69.90%; H, 3.75%; S, 7.88%. Found: C, 69.15%; H, 3.88%; S, 7.49%.

B. Preparation of polymer with 8 wt % of 3,9-bis(p-phenoxybenzoyl)[2.2]paracyclophane (using isophthaloyl chloride)

To a solution of 4,4'-bis(p-phenoxybenzenesulfonyl)-diphenyl ether (52.7 g, 83.0 mM), 3,9-bis(p-phenoxybenzoyl)[2.2]paracyclophane (5.6 g, 9.3 mM), and isophthaloyl chloride (18.7 g, 92.3 mM) in 1,400 ml of dry 1,2-dichloroethane was added $AlCl_3$ (98.9 g, 744 mM). The suspension was stirred under nitrogen at room temperature for 48 hours. The mixture was filtered and the precipitate was washed twice with methanol in a blender. Another washing was performed with chloroform. The bulk of the polymer was washed again in methanol. Yield 59.9 g (85%); mp>360°C (crosslinked prior to melting). The sample was labelled as JW-P1.

Anal. Calc.: C, 70.42%; H, 3.79%; S, 7.58%. Found: C, 69.85%; H, 3.95%; S, 7.10%.

C. Preparation of 15 wt % of 3,9-bis(p-phenoxybenzoyl)-[2.2]paracyclophane (using isophthaloyl chloride)

4,4'-Bis(p-phenoxybenzenesulfonyl)diphenyl ether (2.536 g, 4.0 mM), 3,9-bis(p-phenoxybenzoyl)[2.2-]paracyclophane (0.6 g, 1.0 mM) and isophthaloyl chloride (1.015 g, 5.0 mM) were dissolved in 75 ml of dry dichloroethane. $AlCl_3$ (3.5 g) was added and the mixture stirred under nitrogen atmosphere at room temperature during 24 hours. The precipitate was filtered off and washed four times with methanol in a blender. Yield 3.52 g (93%); mp 225°–235°C. Inherent viscosity 0.575 in $H_2SO_4$ at 30°C. Sample submitted as PS-CP-2.

Anal. Calc.: C, 71.12%; H, 4.04%; S, 6.86%. Found: C, 68.66%; H, 3.92%; S, 6.24%; Res., 2.10%.

A 300 mg sample of PS-CP-2 was heated at 360°C in nitrogen atmosphere for 24 hours. The resultant dark colored product was refluxed in 100 ml of dimethylacetamide, filtered, washed with water and dried. Quantitative yield of crosslinked polymer (soluble in dimethylacetamide) was obtained. This crosslinked polymer was labelled as PS-CP-2-C.

Anal. Calc.: C, 71.12%; H, 4.04%; S, 6.86%. Found: C, 71.12%; H, 3.92%; S, 6.24%; Res., 2.10%.

In this specification, the following abbreviations are used:

cm = centimeter
DMF = dimethylformamide
HMPA = hexamethylphosphoric triamide
hr = hour(s)
mg = milligram(s)
ml = milliliter(s)
mm = millimeter(s) (of mercury)
mM = millimole(s)
mp = melting point

We claim:

1. A linear paracyclophane polymer composed of bis-(phenoxybenzoyl)paracyclophane radicals and radicals selected from the group consisting of bis(phenoxybenzenesulfonyl)benzene and bis(phenoxybenzenesulfonyl)diphenyl ether, linked together with bivalent radicals selected from the group consisting of isophthaloyl and terephthaloyl radicals.

2. A polymer as defined by claim 1 wherein the average molecular weight is from about 30,000 to 120,000.

3. A polymer as defined by claim 2 wherein the bis(phenoxybenzoyl)paracyclophane radicals comprise from about 5 to about 29% of the weight of the polymer.

4. A polymer as defined by claim 3 wherein the ratio of the number of bis(phenoxybenzenesulfonyl)benzene and bis(phenoxybenzenesulfonyl)diphenyl ether radicals to the number of bis(phenoxybenzoyl)paracyclophane radicals is in the range from 1:1 to 20:1.

5. A crosslinked polymer formed by heating a linear polymer as defined by claim 1.

6. A crosslinked polymer formed by heating a linear polymer as defined by claim 3.

7. Method of producing a linear paracyclophane polymer as defined by claim 1 which comprises reacting bis(phenoxybenzoyl)paracyclophane and a compound selected from the group consisting of bis(phenoxybenzenesulfonyl)benzene and bis(phenoxybenzenesulfonyl)diphenyl ether with an acid halide selected from the group consisting of isophthaloyl and terephthaloyl halides in the presence of anhydrous aluminum chloride, and separating the polymer thus formed.

8. Method of claim 7 wherein the total moles of acid halide are equal to 80% to 120% of the total moles of the other components.

9. A cross-linked polymer as defined by claim 5 wherein the linear polymer is heated in an amount sufficient to form a p,p'-dimethylene bibenzyl diradical.

10. A crosslinked polymer as defined by claim 5 wherein the linear polymer is heated to a temperature in the range of about 250° to 360°C.

11. A method as defined by claim 7 further including heating the polymer in an amount sufficient to crosslink said polymer.

* * * * *